Figure 1:
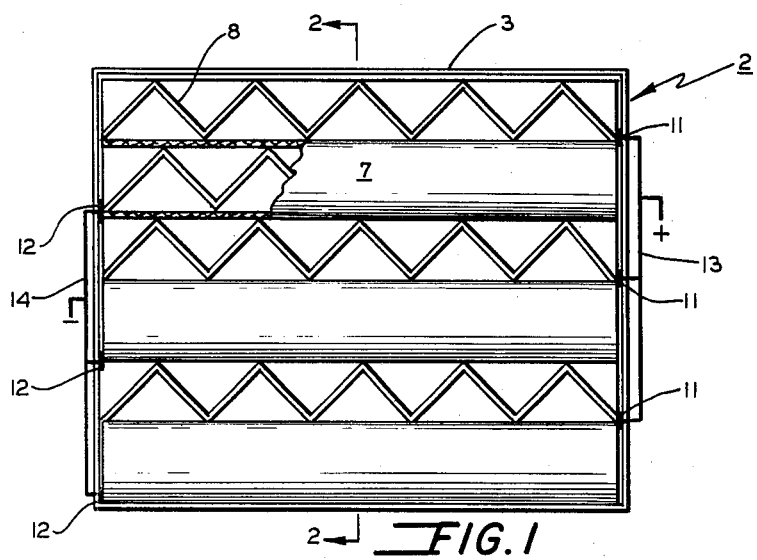

March 29, 1966

R. D. RIVERS 3,242,649

ELECTRICAL GAS CLEANER

Filed Sept. 17, 1963

INVENTOR.
RICHARD D. RIVERS

BY

*Ralph G. Brick*
ATTORNEY 3,242,649
ELECTRICAL GAS CLEANER
Richard D. Rivers, Louisville, Ky., assignor to American Air Filter Company, Inc., Louisville, Ky., a corporation of Delaware
Filed Sept. 17, 1963, Ser. No. 309,433
4 Claims. (Cl. 55—132)

The present invention relates to gas filters and more particularly to disposable type electrical gas filters.

In accordance with the present invention, an improved filter device for effectively cleaning gas both electrically and by impingement is provided without incurring past problems of removal of collected dust, the filter device of the present invention utilizing an inexpensive and disposable frame and dust collecting medium. Further, the present invention provides an improved electrical gas filter device which is compact, sturdy and readily maintainable and which, at the same time, is straight-forward in construction and operation, permitting gas cleaning operations at comparatively low voltages, low gas flow resistance, high gas handling capacity and high gas cleaning efficiency. In addition, the novel structure of the present invention provides an effective electrostatic charge or potential gradient across dielectric filter medium to improve filtering efficiency and, at the same time, such novel structure maintains the filter medium in firm, pleat form, selectively channeling the gas stream to be treated through such filter medium.

Various other features of the present invention will become obvious to one skilled in the art upon reading the disclosure set forth hereinafter.

More particularly, the present invention provides a gas filter comprising: a housing defining a gas flow passage therethrough for a gas stream to be treated; a sheet of dielectric filter medium disposed within the housing in pleat formation across the gas flow passage to extend transverse the direction of flow of the gas stream to be treated; electrically conductive, corrugated spacing members separating the pleats of the filter medium, the corrugations of each spacing member forming gas stream channels contiguous to the pleat of the filter medium which it separates and through which the gas stream to be treated flows; and means to charge and ground the corrugated spacing members in successively alternating fashion to provide a potential gradient across the filter medium therebetween.

It is to be understood that various changes can be made in the arrangement, form and construction of the apparatus disclosed herein without departing from the scope or spirit of the present invention.

Figure 2:
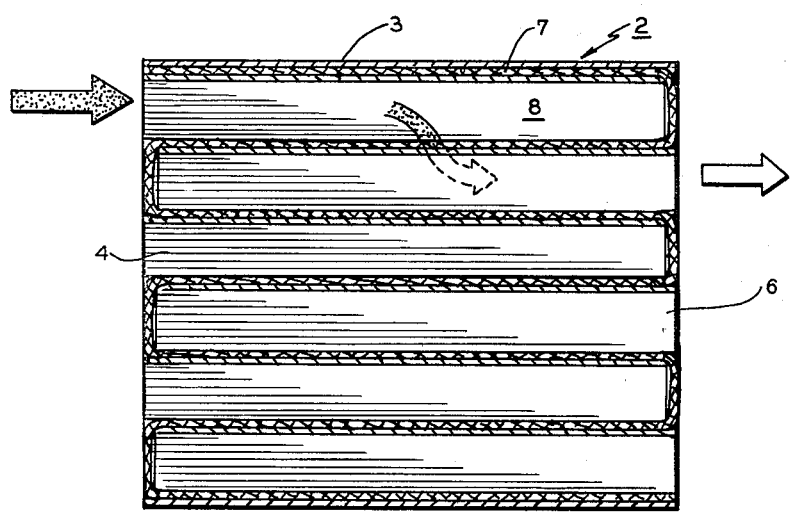

Referring to the drawing, which discloses one advantageous embodiment of the present invention:

FIGURE 1 is a partially broken away, cross-sectional, end elevational view of the inventive apparatus; and, FIGURE 2 is a side elevational view of the apparatus of FIGURE 1, taken in a plane passing through line 2—2 of FIGURE 1.

As can be seen in the drawing, an inventive electrical gas filter 2 is disclosed. Filter 2 includes an open end, rectangularly shaped housing 3 having dirty gas inlet 4 and clean gas outlet 6, the housing serving to define a gas flow passage through which a gas stream to be treated is passed. Housing 3 can be constructed from any one of a number of known, inexpensive, dielectric and disposable materials. For example, chipboard, cardboard or a suitable dielectric plastic material can be used.

Positioned in housing 3 is a continuous sheet of dielectric filter medium 7. Filter medium 7 is folded in pleat formation across the gas flow passage defined by housing 3 to provide a filter member which extends transverse the direction of flow of a gas stream to be treated. Because of the pleat formation and the preselected porosity of filter medium 7, high gas handling capacity, low gas flow resistance and high gas cleaning efficiency is provided. Medium 7 can be comprised of any one of a number of known, porous, dielectric, impingement filtering materials. For example, a porous polyurethane fabric or a thin, matted, porous filter paper of several layers can be utilized. Advantageously, a thin fiber glass mat made from interconnected and bonded fibers which form a maze of interstices therebetween can be used. To prevent any bypassing of the gas to be treated around the pleated media 7, the edges thereof are sealed to the inner walls of housing 3 by a suitable rubber-base cement.

In order to maintain the pleats of filter medium 7 in separated pleat form, corrugated spacing members 8 are provided. Spacing members 8 can be formed from any one of a number of known, sturdy, pliable, electrically conductive materials and, advantageously, a thin metallic aluminum foil can be used. It is to be noted that corrugated spacing members 8 are so positioned that the channels formed by the corrugations thereof extend longitudinally in the direction of gas flow from dirty gas inlet 4 to clean gas outlet 6 with the members 8 being of such breadth as to extend across housing 2 from one side thereof to the other so that the edges thereof abut against opposite inner side walls of housing 3.

The opposite inner side walls of dielectric housing 3 are each provided with one of two sets 11 and 12 of spaced, parallel, electrically conductive stripes. These stripes can be formed from aluminum foil material and can be fastened to the inner walls of housing 3 by a suitable adhesive or by staples. Advantageously, the stripes can be painted on the housing walls with an electrically conductive paint before the housing is erected, in the manner of a printed circuit. The stripes of each stripe set 11 and 12 are so spaced that the stripes of one set 11 on one side wall electrically connect with the adjacent wall abutting edges of every other corrugated spacing member 8 and the stripes of the other set 12 on the opposite wall electrically connect with the adjacent abutting edges of the remaining spacing members 8. Thus, interleaved sets of spacing members 8 are provided, one of which sets of spacing members can be electrically charged and the other of which set can be grounded to establish an electrostatic potential gradient across the filter medium 7 therebetween. In this connection, it is to be noted that the stripes of set 11 are each connected at one end thereof to an electrically conductive bus stripe 13 and that the stripes of set 12 are each connected at one end thereof to an electrically conductive bus stripe 14. The bus stripe 13 is arranged to be insulated from the set of spacing members 8 connected to the stripes of set 12 and the bus stripe 14 is arranged to be insulated from the set of spacing members 8 connected to the stripes of set 11. Advantageously, this can be accomplished by placing the bus stripes 13 and 14 on the outer opposite side walls of housing 3 and electrically connecting each to its set of stripe ends by means of metallic staples. It is then only necessary to connect one of the bus stripes to ground and the other to a suitable electric charge from a power pack (not shown) to provide a potential gradient across the dielectric filter medium 7 disposed between spacing members 8.

The invention claimed is:
1. A gas filter comprising:
  (a) a housing defining a gas flow passage therethrough for a gas stream to be treated;
  (b) a sheet of dielectric filter medium disposed within said housing in pleat formation across said gas flow passage to extend transverse the direction of the flow of the gas stream to be treated;

(c) electrically conductive, corrugated spacing members positioned to separate the pleats of said material with the corrugations of each spacing member forming gas stream channels extending along the line of gas flow contiguous to the pleats of the filter medium through which the gas stream to be treated passes; and, (d) means on said housing in insulated relationship to directly contact and charge and ground said corrugated spacing members in successively alternating fashion whereby said spacing members both space and provide an intensified potential gradient transverse the breadth of said filter medium therebetween.

2. The apparatus of claim 1:
(a) said housing being of dielectric material; and
(b) said means to directly contact and charge and ground said corrugated spacing members comprising coatings of electrically conductive material on opposite side walls of said housing electrically connected to said corrugated spacing members in alternating fashion so that the coating on one of said side walls is electrically connected to every other corrugated spacing member and the coating on the opposite side wall is electrically connected to the remaining spacing members to provide interleaved sets of spacing members one of which sets can be charged and the other grounded.

3. The apparatus of claim 2:
(a) said coatings on said side walls comprising sets of spaced, parallel, electrically conductive stripes;
(b) the edges of one set of interleaved spacing members abutting against one set of said stripe sets to be in electrical contact therewith and the edges of the other set of spacing members abutting against the other set of said stripe sets to be in electrical contact therewith.

4. A gas filter comprising:
(a) a housing defining a gas flow passage therethrough for a gas stream to be treated;
(b) a sheet of dielectric glass fiber filter medium disposed within said housing in pleat formation across said gas flow passage to extend transverse the direction of the flow of the gas stream to be treated;
(c) electrically conductive, metallic foil, corrugated spacing members separating the pleats of said material with the corrugations of each spacing member forming gas stream channels extending along the line of gas flow contiguous to the pleats of the filter medium through which the gas stream to be treated passes; and,
(d) means on said housing in insulated relationship to directly contact and charge and ground said metallic foil, corrugated spacing members in successively alternating fashion whereby said spacing members both space and provide an intensified potential gradient transverse the breadth of said filter medium therebetween.

References Cited by the Examiner
UNITED STATES PATENTS

| | | | |
|---|---|---|---|
| 2,297,601 | 9/1942 | Williams | 55—132 |
| 2,522,568 | 9/1950 | Dahlman | 55—132 |
| 2,579,440 | 12/1951 | Palmer | 55—154 X |
| 2,868,319 | 1/1959 | Rivers | 55—132 |
| 2,908,348 | 10/1959 | Rivers et al. | 55—132 |
| 2,952,333 | 9/1960 | Bush | 55—500 |

ROBERT F. BURNETT, *Primary Examiner*.